United States Patent [19]

Hainline

[11] 4,297,940
[45] Nov. 3, 1981

[54] PROTECTIVE WORKPLACE AND SYSTEM

[75] Inventor: Truman D. Hainline, Peoria, Ill.

[73] Assignee: Tellus Machinery Corporation, Peoria, Ill.

[21] Appl. No.: 117,242

[22] Filed: Jan. 31, 1980

[51] Int. Cl.³ ............................................... F24F 7/00
[52] U.S. Cl. .................... 98/33 R; 98/115 R; 98/DIG. 10; 52/282
[58] Field of Search ............. 98/29, 32, 33 R, 115 R, 98/115 LH, DIG. 10; 181/200, 204, 286, 287, 290, 296; 52/282, 284, 580, 578, 582, 772, 781, 823, 821, 828; 137/177, 197, 203

[56] References Cited

U.S. PATENT DOCUMENTS

| | | | |
|---|---|---|---|
| 2,485,232 | 10/1949 | Brown | 137/203 |
| 3,008,197 | 11/1961 | Trzyna et al. | 52/578 X |
| 3,302,547 | 2/1967 | Wasserman | 98/33 R |
| 3,410,087 | 11/1968 | Arnes | 137/203 X |
| 3,768,222 | 10/1973 | Birum, Jr. | 52/282 X |
| 3,946,528 | 3/1976 | Jacobson et al. | 52/145 X |
| 3,948,347 | 4/1976 | Rutledge | 52/145 X |
| 4,016,689 | 4/1977 | Wendy | 52/145 |
| 4,034,659 | 7/1977 | Raider | 98/36 X |
| 4,098,174 | 7/1978 | Landy | 98/115 LH |
| 4,198,951 | 4/1980 | Ellison et al. | 52/580 X |

OTHER PUBLICATIONS

"Cleaning Cabins", Series TG 700, Leaflet 74TG-E, Tellus Maskin, AB, 1974.

Primary Examiner—Albert J. Makay
Assistant Examiner—Harold Joyce
Attorney, Agent, or Firm—James R. Bell

[57] ABSTRACT

Poor work conditions can be harmful to health and job satisfaction. Frequent absenteeism can result. Where noise and dust or fumes are problems, protective workplaces can be provided. An improved protective workplace is provided which reduces contaminated air and noise while simultaneously improving lighting, access to tools and to workpieces. Also, the workplace is of modular construction so that size and shape can be varied to suit a wide range of applications. Further, a system including a plurality of such workplaces, can share common ventilation input conduits, exhaust conduits and conveyors for carrying workpieces.

9 Claims, 12 Drawing Figures

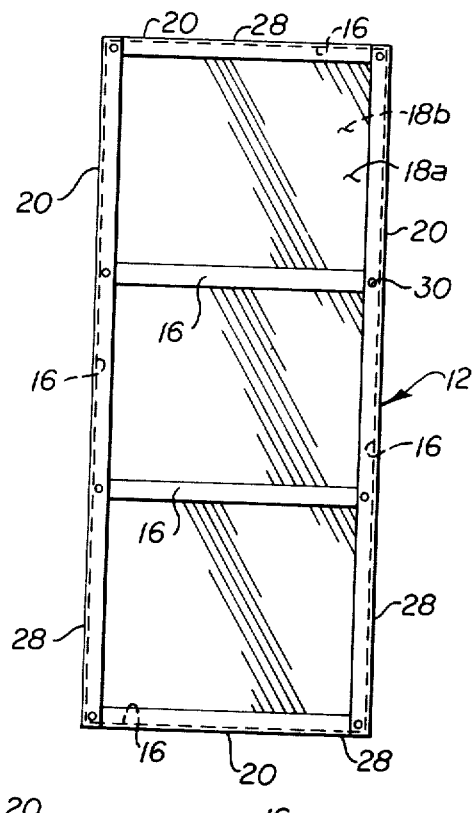
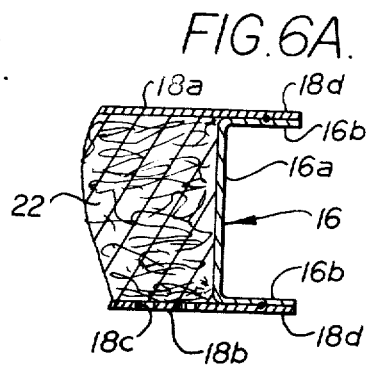
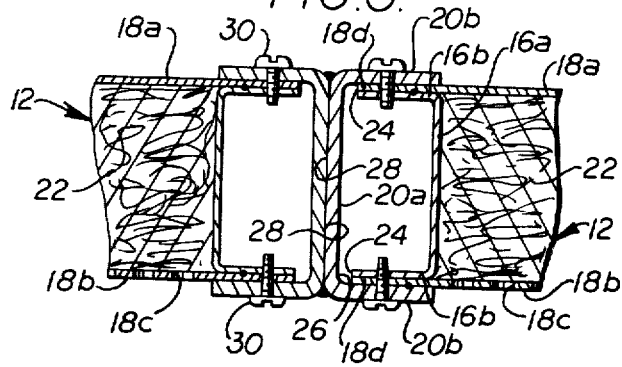
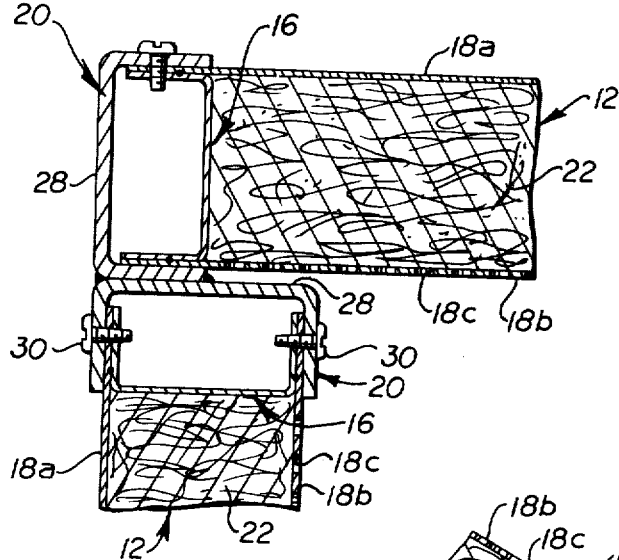
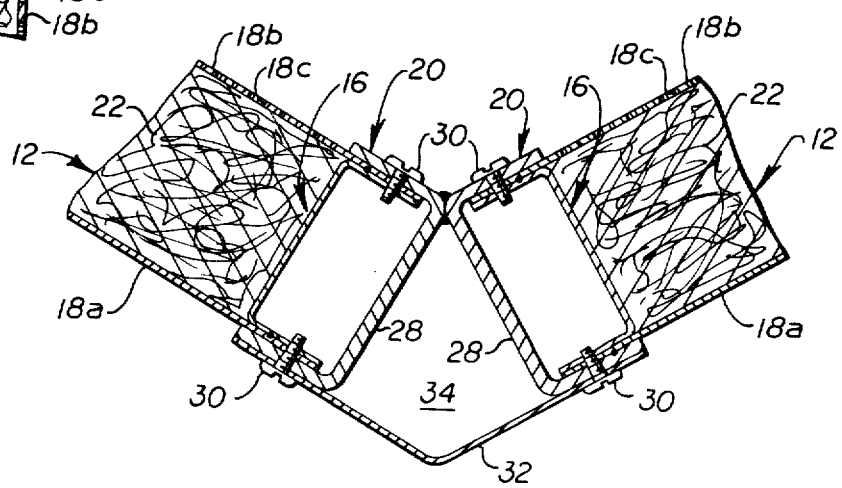

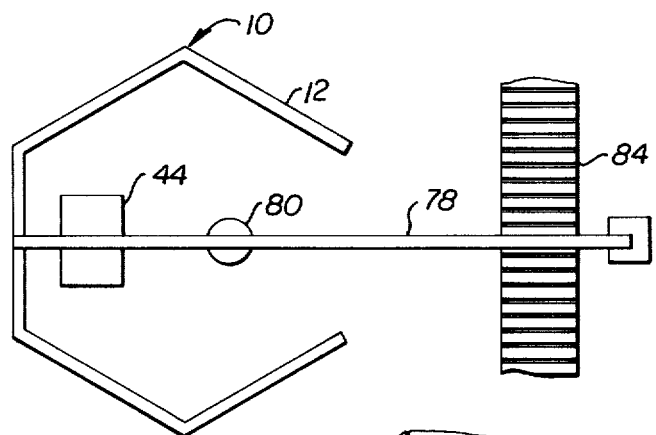
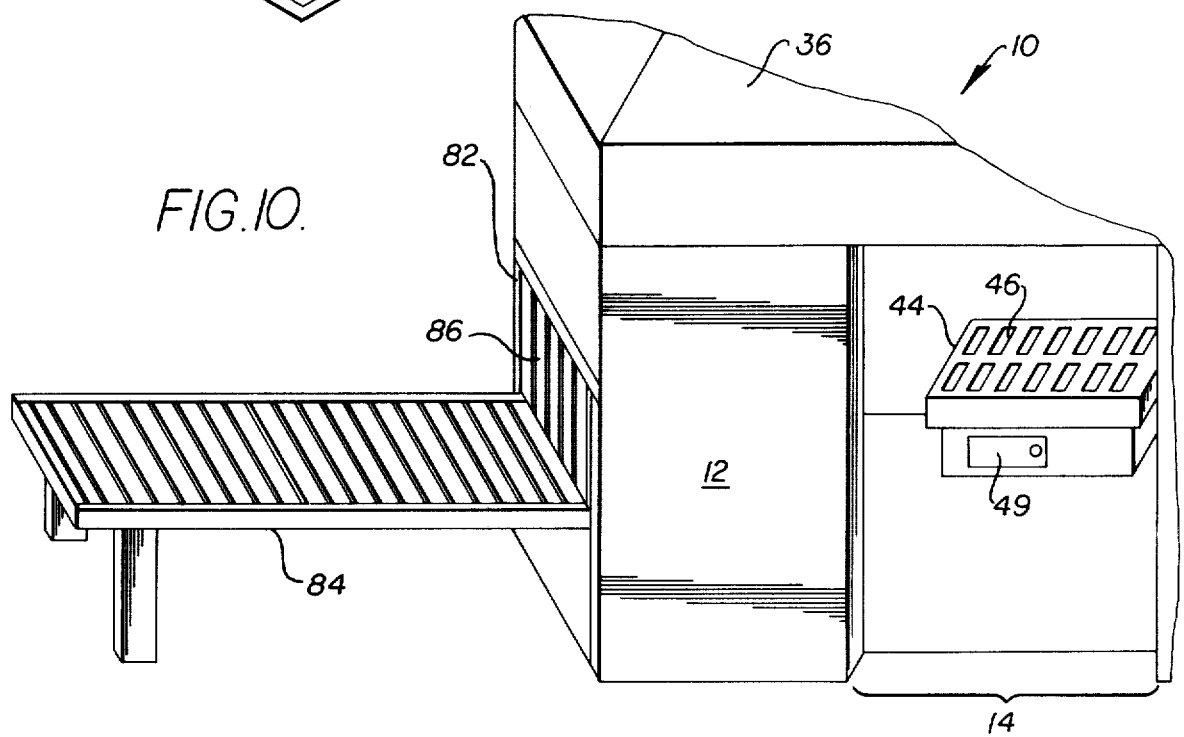
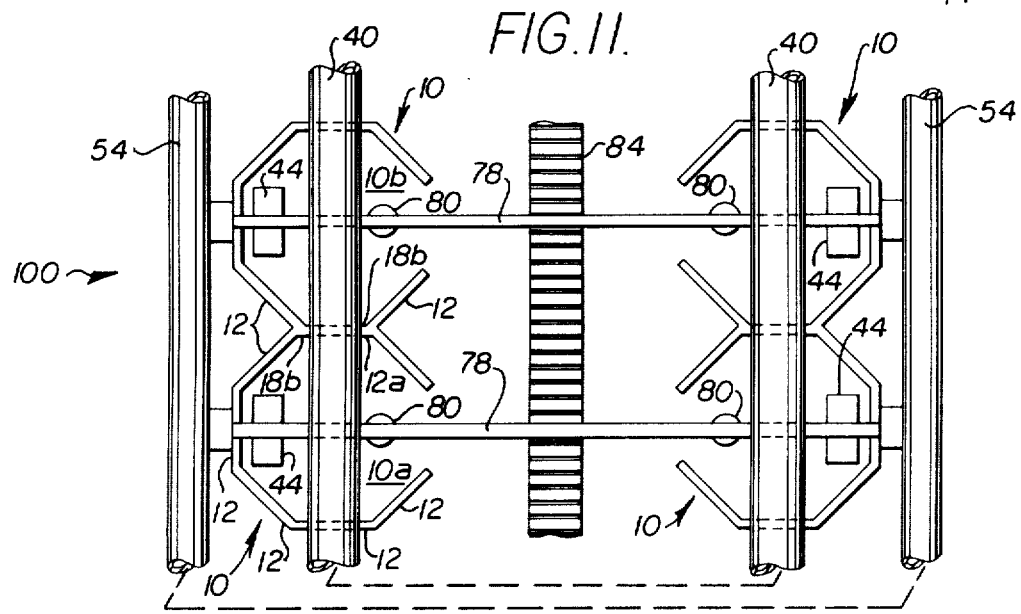

PROTECTIVE WORKPLACE AND SYSTEM

DESCRIPTION

1. Technical Field

This invention relates generally to static structures and more particularly to those with an exposed configuration having an acoustical function.

2. Background Art

Protective workplaces must be provided to improve certain industrial work environments. Such work environments often experience harmful dust or fumes in the surrounding air and harmful noise levels which may not comply with OSHA standards.

Desired features of such workplaces require that they be enclosed, or at least partially enclosed to confine harmful air and noise levels, they must also retain good lighting, include efficiently located work tools and accessories, have convenient access to transporting workpieces to and from the workplace and preferably provide the ability of an operator in the workplace to observe and be observed.

In the past, such workplaces have provided some of the above-mentioned desired features. However, these workplaces do not provide all the desired features. In addition, there is no protective workplace available which, in addition to providing all the desired features, is of modular construction so that size and shape can be easily varied to suit a wide range of applications such as the cleaning of castings.

The foregoing illustrates limitations of the known prior art. Thus, it is apparent that it would be advantageous to provide an alternative directed to overcoming one or more of the limitations as set forth above.

DISCLOSURE OF INVENTION

In one aspect of the present invention, this is accomplished by providing a protective workplace including a plurality of connected, sound absorbing walls. The walls are of modular construction and include a first reinforcing member connected to a pair of spaced panels, at least one of the panels being a sound absorbing panel. A sound absorbing material is retained in the walls. A second reinforcing member is attached to an edge of each wall.

In another aspect of the present invention, a system is provided which includes a plurality of adjacent protective workplaces, as mentioned above, having access to a common ventilating air input conduit, a common ventilating air exhaust conduit and a common conveyor for carrying workpieces.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 5 is a side elevational view illustrating an embodiment of the wall of the workplace apparatus of this invention;

FIG. 6 is a partial cross-sectional view of an embodiment of the structural elements of abutting walls of this invention;

FIG. 6a is a partial cross-sectional view of an embodiment of the modular wall section of this invention;

FIG. 7 is a partial cross-sectional view of another embodiment of the structural elements of abutting walls of this invention;

FIG. 8 is a partial cross-sectional view of another embodiment of the structural elements of abutting walls of this invention;

FIG. 9 is a top view graphic illustration of the workplace apparatus of this invention;

FIG. 10 is a partial isometric view illustrating another embodiment of the workplace apparatus of this invention; and FIG. 11 is a top view graphic illustration of a system using a plurality of the workplace apparatus of this invention.

BEST MODE FOR CARRYING OUT THE INVENTION

Figure 1:
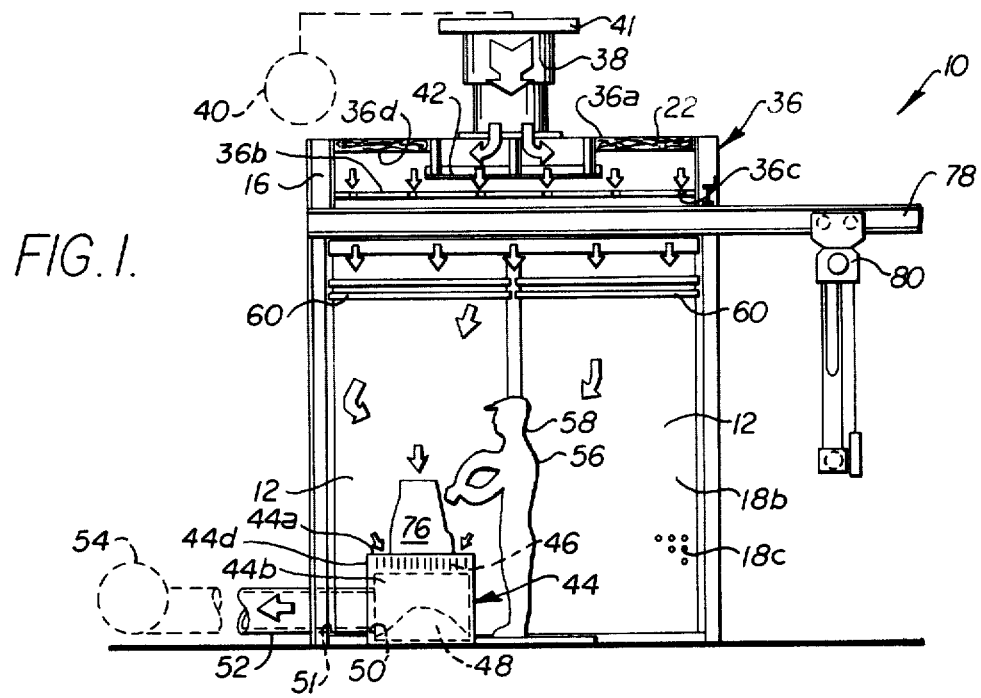
FIG. 1 is a cross-sectional side view illustrating an embodiment of the workplace apparatus of this invention.
Figure 2:
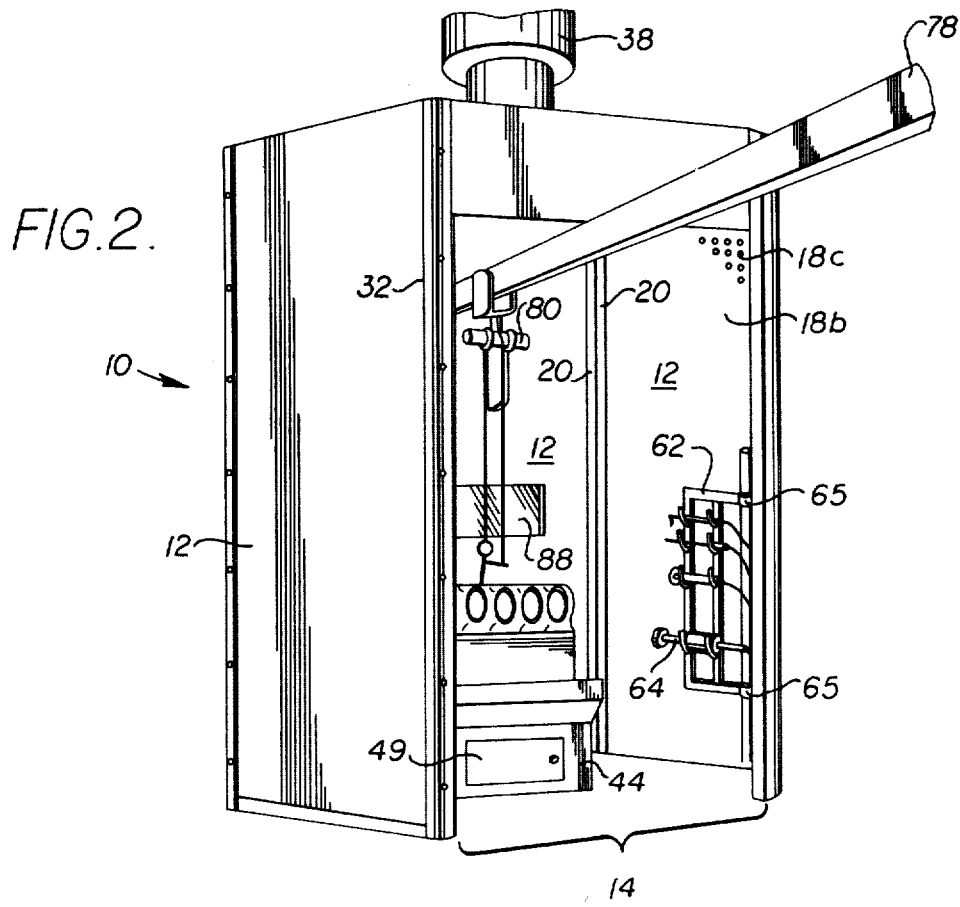
FIG. 2 is an isometric view illustrating another embodiment of the workplace apparatus of this invention.
Figure 3:
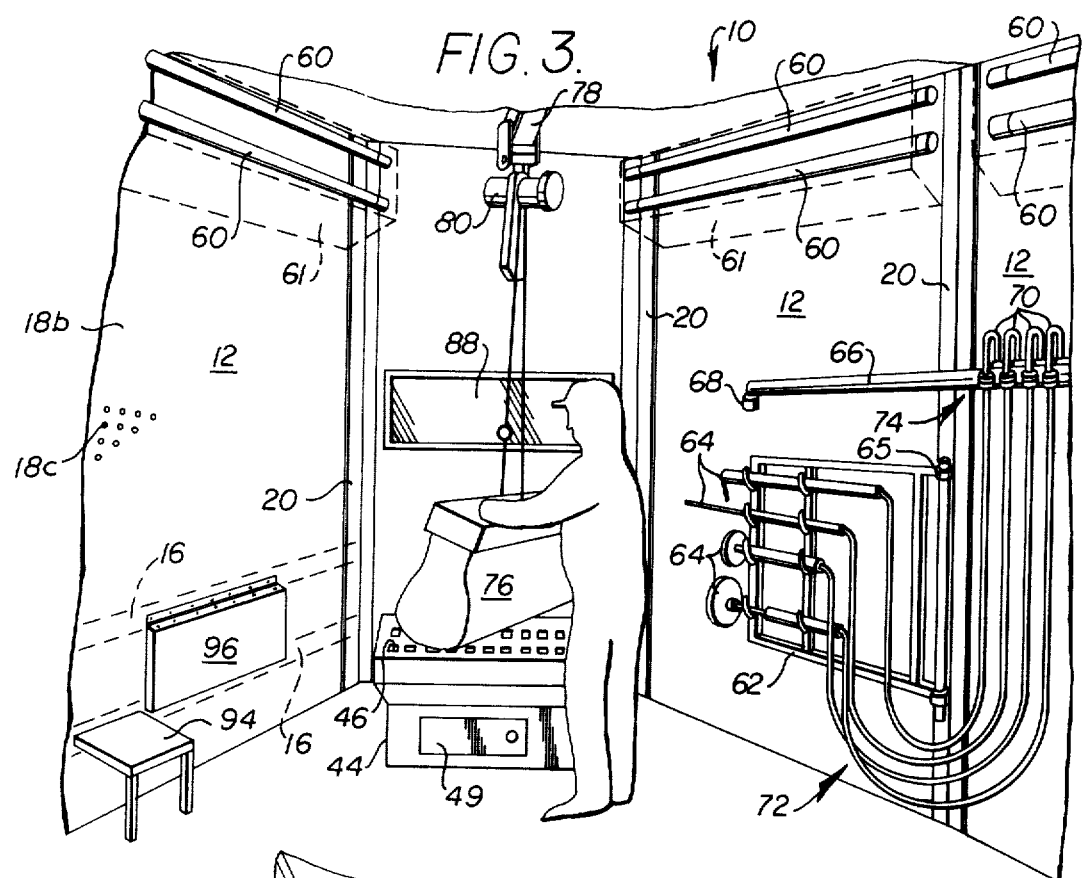
FIG. 3 is a partial isometric view illustrating another embodiment of the workplace apparatus of this invention.

Referring now to the drawings, FIGS. 1, 2 and 3 illustrate a protective modular workplace apparatus of this invention generally designated 10. Workplace 10 comprises a plurality of connected walls 12 at least partially enclosing workplace 10 except for a doorway 14 formed by the walls 12.

In FIGS. 5–8, it can be seen that walls 12 each comprise a first reinforcing member 16, a pair of spaced panels 18a,18b, and a sound absorbing material 22 retained by members 16 and panels 18a,18b.

First member 16 is a well-known channel having a rib 16a and two spaced apart flanges 16b. Member 16 is preferably formed of a suitable cold rolled steel. A plurality of members 16 are welded together to form a rectangular frame including cross members. The number of cross members 16 varies according to the modular size of each wall section 12 but are preferably spaced at between 2 to 3 foot intervals. For modular construction, such modular frames may be formed in a specific variety of sizes which preferably vary in widths of 2 to 5 feet and lengths of 2 to 8 feet.

Panels 18a,18b are preferably formed of a suitable cold rolled sheet steel and formed to fit the modular frames. One of the panels, for example 18a, is for an outside portion of wall 12 and is therefore a solid panel. The other panel, 18b, is for an inside portion of wall 12 and is perforated with openings 18c formed therein for absorbing sound created within workplace 10. Panels 18a,18b each have a portion 18d affixed to flanges 16b, such as by spot welding, in a manner such that rib 16a is recessed between panels 18a, 18b, and panel portions 18d and flanges 16b are coextensive and terminate in side-by-side relationship at a common edge 24.

Sound absorbing material 22 is preferably a specially compacted glass-fiber material such as type 705 manufactured by OWENS CORNING. Material 22 is retained in wall 12 by members 16 and panels 18a,18b.

The foregoing first member 16 frame, the panels 18a,18b, and the sound absorbing material 22 comprises each modular wall section 12 as illustrated in FIG. 6a.

Second member 20 is also a well-known channel having a rib 20a and two spaced apart flanges 20b. Member 20 is preferably formed of a suitable cold rolled steel. Member 20 is of a heavier gauge material than member 16 and flanges 20b are spaced apart by a distance sufficient for inserting flanges 16b and affixed panel portions 18d to a recessed position between flanges 20b until common edge 24 engages a curved portion 26 of rib 20a. In this manner flanges 16b and 20b have a reciprocal relationship, that is, the flanges 16b extend from rib 16a in a first direction and the flanges 20b extend from rib 20a in a second direction opposite the first direction. Second members 20 form a peripheral edge 28 around wall 12 and means such as self tapping screws 30 are used to connect flanges 20b to flanges 16b and panel portions 18d. Members 20 are attached to modular walls 12 and then the walls 12 are ready to be connected.

Walls 12 are connected by attachment of adjacent ones of members 20 as best shown in FIGS. 6–8. Attachment is preferably accomplished by welding. In FIG. 6, adjacent walls 12 are attached in a straight line configuration; in FIG. 7, adjacent walls 12 are attached in a right angle configuration; and in FIG. 8, adjacent walls 12 are attached in an obtuse angle configuration. Also in FIG. 8, a plate 32 is preferably attached by either welding or by screws 30 to close a void 34 formed between members 20 due to their angular relationship.

Another aspect of walls 12 is illustrated in FIG. 11 which illustrates a workplace cleaning system (discussed later) including a plurality of adjacent protective modular workplace apparatus 10. In this case, a wall 12a of one workplace 10a is common to an immediately adjacent workplace 10b, and wall 12a preferably includes two spaced panels 18b so as to expose a perforated sound absorbing panel to each of the workplaces 10a,10b.

From the foregoing, it can be appreciated that a specific planned variety of sizes of wall 12 can provide flexibility for forming modular workplace apparatus 10 of various sizes and shapes, e.g, hexagonal, rectangular, octagonal, etc.

A roof 36, FIG. 1, is formed of a framework of channels 16 enclosed by panels 36a,36b preferably of cold rolled sheet steel similar to the panels used for forming wall 12. An upper panel 36a is solid whereas a lower panel 36b is spaced from panel 36a and perforated with a plurality of openings 36c for permitting ventilating air to pass through as indicated by directional arrows. Preferably, although not mandatory, a layer of insulating material 22 is provided between panel 36a spaced from a perforated panel 36d. Roof 36 is supported on and welded to walls 12.

Means, such as a blower unit 38 is connected to roof 36 for urging ventilating air into workplace 10. The ventilating air is drawn from an air input conduit 40 and urged into roof 36 then deflected by a deflector 42 as indicated by directional arrows. Upon being deflected, the air fills the plenum space between panels 36b and 36d then is urged downwardly to be diffused through openings 36c and into workplace 10. The preferred unit 38 for urging the ventilating air into workplace 10 is a commercially available model number 4c250 sold under the trade name DAYTON. If desired, a well-known electrostatic filter unit 41 can be used in connection with blower unit 38.

A work table 44 is an available accessory positioned in workplace 10. A plurality of ventilating slits 46 are provided in work table 44 for permitting ventilating air to pass through top surface 44a and into an open portion 44b of table 44. Slits 46 are sufficient to permit debris from cleaning castings, such as metallic dust, burrs and chip to pass into open portion 44b where larger pieces of metallic debris 48 are trapped. The trapped debris 48 may be removed through a clean-out door 49.

Means, such as unit 52, can be connected to an opening 51 provided in wall 12 for urging ventilating air from workplace 10, through slits 46 and out of open portion 44b. An opening 50 is provided in sidewall 44d of table 44 to permit ventilating air to be urged out of table 44. The preferred unit 52 is matched to unit 38. Air drawn from workplace 10 is urged into an air exhaust conduit 54. The preferred ventilation requirements of workplace 10 call for a fresh air supply of about 5000 cubic meters per hour capable of maintaining dust below the shoulder level 56 of an operator 58 at only 0.8 mg per cubic meter.

Means, such as commercially available fluorescent tubes 60, protected by covers 61, (FIG. 3) are provided for lighting inside workplace 10. A plurality of tubes 60 are provided at various positions, such as mounted on walls 12, relative to work table 44. The preferred lighting requirements call for lighting measured at about 1000 lux at work table 44.

Means, such as a metal rack 62, (FIGS. 2,3) is provided for supporting a plurality of tools 64 in workplace 10. Rack 62 is formed of pieces of metal tubing welding together and pivotally attached at 65 to wall 12. In this manner, rack 62 and tools 64 can be moved relative to work table 44 for improving work efficiency. Tools 64 are commonly known casting cleaning tools such as pneumatic grinders and pneumatic burring tools operated by high pressure air as is well known.

Means are provided for carrying pressurized air to tools 64. The means includes a main pressurized air supply line such as a capped pipe 66 mounted to wall 12 and connected, externally of workplace 10, to a well-known compressor (not shown). Air for operating tools 64 is commonly pressurized to about 80 psi as is well known. Moisture is commonly present in such air lines 66. A well-known moisture trapping blow-out valve 68 is connected to pipe 66 for releasing accumulated moisture which occasionally condenses in pipe 66.

Means are provided for limiting passage of moisture from pipe 66 to tools 64. Such means includes a plurality of metallic gooseneck attachments 70 connected to pipe 66. Attachments 70 can be connected to pipe 66 by threaded attachment, by welding or by a commonly available quick disconnect device. Attachments 70 extend above main air supply pipe 66. In this manner, moisture is restricted in gooseneck attachment 70 and, due to gravity, runs back down into pipe 66 and eventually is trapped in valve 68. Such an arrangement limits moisture collection in a plurality of hoses 72 attached to tools 64.

Hoses 72 are well-known high-pressure flexible hoses each connected to goosenecks 70 by well-known quick disconnect devices 74. Hoses 72 are of sufficient length to permit tools 64 to reach table 44.

Means are provided for moving a workpiece 76 from a conveyor 84 to workplace 10 (See FIGS. 1, 2 and 9). Such means preferably includes an overhead support such as an I-beam 78 extending into workplace 10 through doorway 14. Beam 78 is supported by wall 12. Means, such as a well-known electrically powered hoist 80, is movably connected to beam 78 for moving into and out of workplace 10 and for lifting workpieces 76 relative to work table 44. Workpieces 76 are castings but generally are large castings such as engine blocks.

Alternatively, means for moving workpiece 76 to workplace 10 includes an opening 82 formed in wall 12, FIG. 10, and conveyor 84 extending adjacent opening 82. In this manner, workpieces 76 can be moved to opening 82 for handling by an operator. Opening 82 preferably includes synthetic or fabric strips 86 as a cover. Obviously, a lift-truck (not shown) could transport workpieces 76 to doorway 14.

Figure 4:
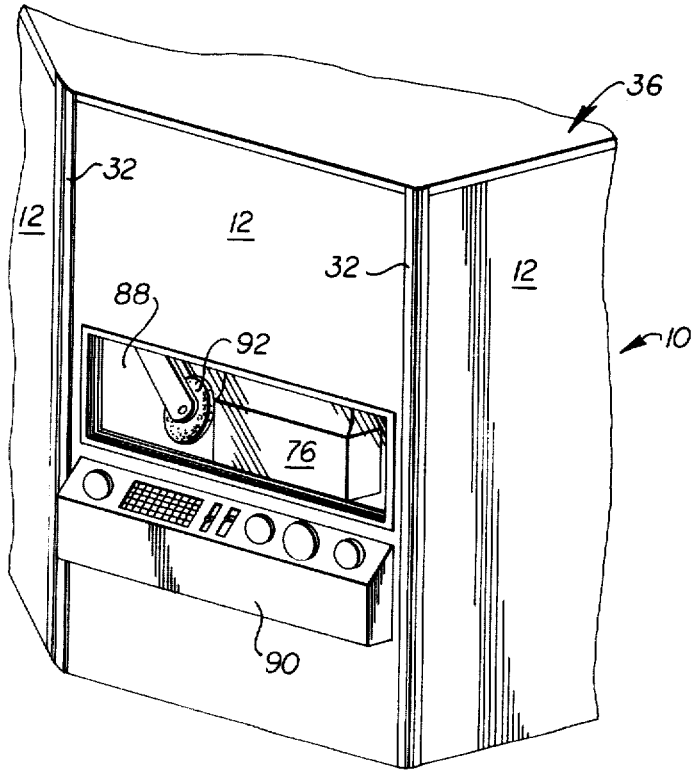
FIG. 4 is a partial isometric view illustrating another embodiment of the remote control application used with the workplace apparatus of this invention.

A window 88 can be provided in wall 12. Preferably, such a window is preferably a double-pane window formed of transparent plastic sheets sold under the trademark PLEXIGLAS. Benefits of window 88 are twofold. First, window 88 can benefit an operator by helping avoid the feeling of confinement. Second, window 88 can serve as a means to observe the operator to insure the operator's safety. Additionally, for operations which should be performed remotely, (FIG. 4) a remote control panel 90 can be attached to wall 12 outside workplace 10 adjacent window 88. An operator can then remotely operate a tool, such as a swing grinder 92, from a remote position outside workplace 10 while observing operations through window 88.

An optional collapsible seat 94 and an optional table 96, (FIG. 3), can be pivotally attached to wall 12 for operator convenience for use as a work table or a lunch/rest device.

Apparatus 10 can be incorporated into a workplace cleaning system 100. Such a system 100 (FIG. 11) comprises a plurality of adjacent protective modular workplace apparatus 10. A common ventilating air input conduit 40 is connected to supply ventilating air to each workplace 10. A common ventilating air exhaust conduit 54 is connected to exhaust ventilating air from each workplace 10. Also, a common conveyor 84 can feed workpieces to a common area adjacent workplaces 10. Subsequently, hoist 80 can move workpieces from conveyor 84 along beam 78 to work table 44.

INDUSTRIAL APPLICABILITY

With the parts assembled as set forth above a protective modular workplace apparatus 10 is provided in accordance with modern principles of human factors engineering (ergonomics).

A protective modular workplace 10 is provided to limit harmful dust and noise during dirty and noisy casting cleaning operations. Thus, shop areas immediately surrounding the workplaces 10 are well protected from such dust and noise.

An operator is not isolated at his workplace 10. The operator is visually in contact with his co-workers outside workplace 10. Lighting is adequately provided. Transportation of castings 76 is facilitated and ventilation is substantially increased.

Walls 12 are constructed of substantial frame members 16,20 and covered by panels 18a,18b. The walls 12 are filled with sound absorbing material. A specific variety of wall sizes provides for convenient modular sections of wall 12 which can be connected to form a variety of sizes and shapes for workplace 10.

The foregoing has described a protective workplace which is well lighted, well ventilated, provides easy access to tools and reduces the noise level in areas adjacent the workplace.

It is anticipated that aspects of the present invention, other than those specifically defined in the appended claims, can be obtained from the foregoing description and the drawings.

I claim:

1. A protective modular workplace apparatus comprising:
   (a) a plurality of connected walls at least partially enclosing a workplace, said walls forming a doorway therewith, each of said walls including a first reinforcing member connected to a pair of spaced panels, at least one of said panels being a sound-absorbing panel, a sound-absorbing material retained by said first reinforcing members and said panels, and a second reinforcing member attached to an edge surface of each wall, said second reinforcing member of one wall connected to a second reinforcing member of an adjacent wall;
   (b) said first reinforcing member includes a rib and a pair of spaced flanges, said first member rib being recessed between said panels, said first member flanges and panels having coextensive portions terminating in side-by-side relationship, said coextensive portions being affixed, and second reinforcing member includes a rib and a pair of spaced flanges, said second member rib forming an edge of said wall, said coextensive portions of said first member flanges and panels being recessed within said second member abutting said second member rib, said first and second reinforcing members being in reciprocal relationship;
   (c) a roof connected to said walls, said roof including an upper panel spaced from a lower panel, said upper panel having means, such as a first flower, for urging ventilating air between said panels, said first blower having a deflector associated therewith, said lower panel having openings formed therein, said openings being of a construction sufficient for permitting said air to pass therethrough and into said workplace; and
   (d) means, in a portion of said walls, for urging said ventilating air from said workplace, said means including a second blower substantially matched to said first blower.

2. The apparatus of claim 1 including:
   means for connecting said second member flanges to said first member flanges and said panels.

3. A protective modular workplace apparatus comprising:
   (a) a plurality of connected walls at least partially enclosing a workplace, said walls forming a doorway therewith, each of said walls including a first reinforcing member connected to a pair of spaced panels, at least one of said panels being a sound-absorbing panel, a sound-absorbing material retained by said first reinforcing members and said panels, and a second reinforcing member attached to an edge surface of each wall, said second reinforcing member of one wall connected to a second reinforcing member of an adjacent wall, said first reinforcing member includes a rib and a pair of spaced flanges, said first member rib being recessed between said panels, said first member flanges and panels having coextensive portions terminating in side-by-side relationship, said coextensive portions being affixed, and second reinforcing member includes a rib and a pair of spaced flanges, said second member rib forming an edge of said wall, said coextensive portions of said first member flanges and panels being recessed within said second member abutting said second member rib, said first and second reinforcing members being in reciprocal relationship;

(b) a roof supported by said walls, said roof including an upper panel spaced from a lower panel;

(c) means such as a first blower mounted in said upper panel, for urging ventilating air between said panels, said first blower having a deflector associated therewith, said lower panel having openings formed therein, said openings being of a construction sufficient for permitting said air to pass therethrough and into said workplace;

(d) a work table positioned in said workplace, said work table including ventilating slits;

(e) means for urging said ventilating air from said workplace through said ventilating slits, said means including a second blower substantially matched to said first blower and connected to one of said walls adjacent said work table;

(f) means for lighting inside said workplace, said lighting means provided at various positions relative to said work table;

(g) means for supporting tools inside said workplace, said means being a rack connected for movement relative to said work table;

(h) means for carrying pressurized air to said tools, said means including a main pressurized air supply;

(i) means for limiting passage of moisture to said tools, said means connected to and extending above said main air supply; and (j) means for moving a workpiece to said workplace.

4. The apparatus of claim 3 wherein said means for moving a workpiece to said workplace includes an overhead support extending into said workplace through said doorway, said support connected to said walls, said moving means further includes means for lifting said workpiece relative to said work table, said lifting means being movable on said support.

5. The apparatus of claim 3 wherein said means for moving a workpiece to said workplace includes an opening in one of said walls and a conveyor extending to said opening.

6. A workpiece cleaning system comprising:

(a) a common ventilating input conduit;

(b) a common ventilating air exhaust conduit;

(c) a common conveyor, and (d) a plurality of adjacent protective modular workplace including:

(1) a plurality of connected walls at least partially enclosing each workplace, said walls forming a doorway therewith, each of said walls including first reinforcing members connected to a pair of spaced panels, at least one of said panels being a sound-absorbing panel, a sound-absorbing material retained by said first reinforcing member attached to an edge surface of each wall, said second reinforcing member of one wall connected to a second reinforcing member of an adjacent wall, said first reinforcing member includes a rib and a pair of spaced flanges, said first member rib being recessed between said panels, said first member flanges and panels having coextensive portions terminating in side-by-side relationship, said coextensive portions being affixed, and second reinforcing member includes a rib and a pair of spaced flanges, said second member rib forming an edge of said wall, said coextensive portions of said first member flanges and panels being recessed within said second member abutting said second member rib, said first and second reinforcing members being in reciprocal relationship (2) each apparatus having a roof supported by said walls, said roof including an upper panel spaced from a lower panel;

(3) means such as a first blower mounted in said upper panel, for urging ventilating air between said panels, said first blower having a deflector associated therewith, said lower panel having openings formed therein, said openings being of a construction sufficient for permitting said air to pass therethrough and into said workplace, said first blower being connected to said common ventilating air input conduit;

(4) a work table positioned in each workplace, each work table including ventilating slits;

(5) means for urging said ventilating air from each workplace through said ventilating slits, said means including a second blower substantially matched to said first blower and connected to one of said walls adjacent said work table and connected to said common ventilating air exhaust conduit;

(6) means for lighting inside each workplace, said lighting means provided at various positions relative to said work table;

(7) means for supporting tools inside each workplace, said means being a rack connected for movement relative to said work table;

(8) means for carrying pressurized air to said tools, said means including a main pressurized air supply;

(9) means for limiting passage of moisture to said tools, said means connected to and extending above said main air supply; and

(10) means for moving a workpiece between each workplace and said common conveyor.

7. The system of claim 6 wherein a wall of one of the workplaces is common to an immediately adjacent another one of the workplaces.

8. A protective modular workplace apparatus comprising:

(a) means for forming a workplace of varying size and shape;

(b) said means including a plurality of connected walls at least partially enclosing said workplace;

(c) said walls forming a doorway therewith;

(d) each wall formed of only three different structural elements including:

(1) a plurality of first reinforcing members connected to form a frame of preselected size, each first member including a rib and a pair of spaced flanges;

(2) a pair of panels, one of said panels being a sound-absorbing panel, said first member ribs being recessed between said panels, said first member flanges and panels having coextensive portions terminating in side-by-side relationship, said coextensive portions being affixed;

(3) a plurality of second reinforcing members larger than said first members, each of said second members including a rib and a pair of spaced flanges, said second member ribs forming an edge of said wall, said coextensive portions of said first member flanges and said panels being recessed within and connected to said second member flanges and in abuttment with said second member rib, said first and second member flanges being in reciprocal relationship, said second member of one wall connected to a second member of an adjacent wall in preselected orientation;

(e) a sound-absorbing material retained by said panels and first members;

(f) a roof connected to said walls, said roof including an upper panel spaced from a lower panel, said upper panel having means, such as a first blower, for urging ventilating air between said panels, said first blower having a deflector associated therewith, said lower panel having openings formed therein, said openings being of a construction sufficient for permitting said air to pass therethrough and into said workplace; and (g) means, in a portion of said walls, for urging said ventilating air from said workplace, said means including a second blower substantially matched to said first blower.

9. The apparatus of claim 8 including:

said second members of said one wall and said adjacent wall defining a void when said preselected orientation is an obtuse angle; and means for covering said void, said means connected to said one wall and said adjacent wall.

* * * * *